US011864689B2

(12) United States Patent
Pachi et al.

(10) Patent No.: US 11,864,689 B2
(45) Date of Patent: Jan. 9, 2024

(54) COFFEE GRINDER WITH WEIGHT CONTROL DEVICE OF THE DOSE OF GROUND COFFEE

(71) Applicant: DRM S.r.l., Casarile (IT)

(72) Inventors: Simone Pachi, Casarile (IT); Giovanni Bozzola, Casarile (IT)

(73) Assignee: CMA Macchine per Caffè S.r.l., Susegana (IT)

( * ) Notice: Subject to any disclaimer, the term of this patent is extended or adjusted under 35 U.S.C. 154(b) by 261 days.

(21) Appl. No.: 17/289,901

(22) PCT Filed: Aug. 28, 2019

(86) PCT No.: PCT/IB2019/057251
§ 371 (c)(1),
(2) Date: Apr. 29, 2021

(87) PCT Pub. No.: WO2020/089706
PCT Pub. Date: May 7, 2020

(65) Prior Publication Data
US 2022/0000314 A1    Jan. 6, 2022

(30) Foreign Application Priority Data
Oct. 30, 2018   (IT) .......................... 102018000009926

(51) Int. Cl.
*A47J 42/44*    (2006.01)
*A47J 42/40*    (2006.01)
(Continued)

(52) U.S. Cl.
CPC .............. *A47J 42/44* (2013.01); *A47J 42/40* (2013.01); *A47J 42/50* (2013.01); *G01G 13/2906* (2013.01)

(58) Field of Classification Search
CPC ............. A47J 42/40; A47J 42/44; A47J 42/50
See application file for complete search history.

(56) References Cited

U.S. PATENT DOCUMENTS

2014/0203118 A1*  7/2014 Rego ....................... A47J 42/40
                                                                  241/6
2016/0143481 A1*  5/2016 Merelli ................... A47J 42/40
                                                                  241/34
(Continued)

FOREIGN PATENT DOCUMENTS

CH          566759 A5  *  9/1975
EP          3023041         5/2016
(Continued)

OTHER PUBLICATIONS

English translate (CH566759A5), retrieved date Apr. 8, 2023.*
English translate (EP3158902A1), retrieved date Apr. 8, 2023.*

*Primary Examiner* — Matthew Katcoff
*Assistant Examiner* — Mohammed S. Alawadi
(74) *Attorney, Agent, or Firm* — Themis Law

(57) ABSTRACT

A coffee grinder with a weight device to dose ground coffee includes an electric motor, a grinder group driven by the electric motor and housed inside a grinding chamber, a feed hopper for feeding coffee beans to the grinding chamber, a delivery channel for delivering ground coffee to a support fork of a filter-holder of the ground coffee, a load cell mechanically connected to the fork, and a microprocessor that controls the operation of the motor to determine a desired final dose of ground coffee inside the filter-holder. The microprocessor contains control firmware which, when weighing a new dose of coffee: (a) activates a weighing program that activates the electric motor so that the grinder group grinds the coffee; (b) continuously controls, with the load cell, the detected weight of ground coffee reaching the filter-holder; and (c) shuts the electric motor down when the detected weight reaches a desired value.

11 Claims, 6 Drawing Sheets

(51) Int. Cl.
    *A47J 42/50*     (2006.01)
    *G01G 13/29*     (2006.01)

(56) References Cited

U.S. PATENT DOCUMENTS

2017/0127884 A1    5/2017   Oddera
2019/0301924 A1*  10/2019  Muheim ................ G01G 19/52

FOREIGN PATENT DOCUMENTS

| EP | 3158902 | 4/2017 |
| EP | 3158902 A1 * | 4/2017 |
| WO | 2018216043 | 11/2018 |

* cited by examiner

COFFEE GRINDER WITH WEIGHT CONTROL DEVICE OF THE DOSE OF GROUND COFFEE

FIELD OF THE INVENTION

The present invention refers to a coffee grinder with a device for controlling each time the weight of the dose of coffee ground. In particular, the invention is directed to a machine of this type wherein the weight control is directly carried out on the individual dosages, by a weighing device housed inside the coffee grinder.

STATE OF THE PRIOR ART

The market of the coffee shops has long requested coffee grinders able to grind the coffee beans at the time of consumption, so as to take advantage of the full release of the aromas during the preparation of the coffee, in particular the so-called espresso coffee. As it is well known, in fact, the powdered ground coffee allows a higher contact with boiling water and thus a better and more complete extraction of the various components; however, the powdered coffee rapidly loose taste and aromas, therefore it is advisable that the coffee beans are ground only shortly before use. The grinding carried out "at the moment", and thus immediately prior to the preparation of the coffee, constitutes a crucial step in which the granulometry of the powder obtained and its homogeneity constitute decisive factors for the success of all subsequent operations, in order to transfer the properties of the coffee bean at the best possible extent to the coffee cup of an espresso coffee.

In order to meet this requirement—initially felt in the gourmet coffee-shop sector, and thus rapidly shared all over the coffee world—the technological progress has allowed to enter in the market innovative coffee grinders able not only to carry out a micrometric adjustment of the desired granulometry of the ground coffee, but also to ensure always delivering the same amount of the same over time, herein below also defined as "dose". In fact, because the granulometry profile of the powder of ground coffee is significantly influenced by external environmental variables, such as in particular humidity and temperature, it was necessary to prepare real-time control systems in the preparation of the dose of ground coffee, so to being able to offer to the consumers an espresso coffee having perfectly constant organoleptic characteristics despite the continuous variability of said environmental conditions.

Then the market pushed towards the production of coffee grinders able to dispense doses of coffee of exactly the desired weight, for example single doses of 7 grams, with the highest possible accuracy, managing in the most appropriate way the variables occurring in the grinding process and the problems due to variations in the environmental working conditions, such as temperature and humidity, as well as the type and degree of drying in the coffee blend used and other similar variables.

Herein below the salient characteristics of the most representative documents of the state of the most recent art of the coffee grinders are briefly commented.

EP2694216 (February 2014) describes a coffee grinding machine which comprises a weighing system of the dose of coffee delivered on the basket of the filter-holder, the support fork of which is directly connected to a load cell arranged inside the machine structure.

EP3019057 (May 2016) describes a coffee grinding machine with a weighing system similar to that described in the previous patent, wherein a support system for the filter-holder is provided, which allows the travel limit stops of the load cell to be safeguarded in case high external forces are applied, thus also allowing the settling function of the ground coffee in the filter by striking it against the surface of the device.

EP3097831 (November 2016) describes a coffee grinding machine, the load cell of which is arranged outside the structure, under the support surface of the container of the ground coffee. Said load cell is connected to a processing unit which adjusts the grinding time. The calibration of the dose is in fact determined based on a mean grinding speed value. Said value is then periodically updated, at the user's request, on the basis of a self-regulation process which plans to carry out a certain number of deliveries having different duration and thus different weight and thus to process the resulting weights to determine, in g/s, said mean value of weighing speed. The processing unit is thus automatically calibrated on this new value.

EP3158902 (April 2017) describes a coffee grinding machine proposing a leverage system between the fork of the filter-holder and the load cell. Said leverage system comprises a travel limit means of the free end of the load cell to protect the weighing device in the presence of overloads.

EP3167782 (May 2017) describes a coffee grinding machine carrying out the continuous calibration during the normal operation of the machine, each time a predetermined number of weighings of the different types is achieved. The calibration system then substantially follows the same procedure described in the previous patent EP3097831, in the name of the same applicant, as commented above.

In the current state of the art, the coffee grinders are thus equipped with a calibration system wherein the weight of the ground dose is indirectly calculated depending on the grinding time, whereas the weighing of the final dose of ground coffee actually reaching the filter-holder is only used when calibrating to calculate the mean grinding speed. Thus, the measurement of the weight of ground coffee is not carried out directly on the weight of the coffee deposited each time inside the filter-holder, because it has been considered until now that this type of direct measurement could not allow sufficient precision.

However, the known systems described above have drawbacks intrinsically connected to the indirect calculation method chosen, drawbacks which do not allow a satisfactory precision result to be achieved in the calculation of the weight of the dose of ground coffee.

Regarding this the Applicant has in fact first of all found, in the studies and experiments carried out, that in the initial transitional period of the grinding the actual grinding speed differs considerably from the mean grinding speed calculated during the calibration of the machine—depending on random errors related to the duration of the warm-up time, the shape of the grinders, the arrangement of the coffee beans above the grinders and of those already partially inserted between the same and finally the specific stop position of the grinders—so determining not negligible heterogeneity in the actual weight of the ground dose, even with the same grinding time.

A second drawback then derives from the fact that the measurement of the grinding time actually defines a dosage immediately downstream of the grinders and thus upstream of the channel transferring the ground coffee towards the filter-holder. This involves the possibility that during this path, especially in the final dosing step, residues of ground coffee can stop also at minute surface irregularities of said channel, so decreasing the actual amount of coffee arriving to the filter-holder in a single dosage operation, and correspondingly increasing the amount in the following dosage operation in which the residue of ground coffee, which stopped in the channel, is dragged in the filter-holder together with the coffee ground in such subsequent dosage.

The problem handled by the present invention is thus to find a weighing mode of the ground coffee which is free from the aforementioned drawbacks and thus able to achieve a degree of weight precision and constancy of the ground dose higher than that offered by the coffee grinders currently on the market.

In the scope of this problem, a first purpose of the present invention is to provide a coffee grinding machine in which the dose of ground coffee is measured directly, i.e. by preferably measuring the weight at the same time the ground coffee reaches the filter-holder.

A second purpose of the present invention is then to provide a coffee grinding machine in which the actual weight of the dose of ground coffee is effectively and continuously controlled, in the following dosages, to maintain a perfect calibration of the coffee grinder depending on many external conditions which influence the outcome of the grinding.

A further purpose of the present invention is to allow the dose of ground coffee to be determined depending on the weight of coffee which is picked up in the filter-holder, also in addition to, alternatively or in combination, depending on the activation time of the grinders, preferably operating in the mode which provides the measurement of the weight, yet containing a manual or automatic switching from determining the dose based on the weight to determining the dose based on the activation time of the grinders.

BRIEF DESCRIPTION OF THE INVENTION

This problem is solved and these purposes are achieved by a coffee grinder having the characteristics defined in the attached claim 1. Other preferred characteristics of the coffee grinder of the invention are defined in the secondary claims.

An embodiment of the invention provides, in combination with the load cell, a clock for the measurement of the activation times of the grinders during the grinding step of the coffee for a predetermined dose measured based on the weight detected by the load cell;

a switching unit which is manually or automatically driven and switching the control unit between two alternative operating conditions, one condition where the dose of coffee is established based on the weight detected by the load cell and the other condition where the dose of coffee is determined based on the activation time.

According to a preferred embodiment, the switching takes place based on a reliability assessment of the predetermined Δ value, corresponding to the weight of ground coffee which reaches the filter-holder during the shutdown transient of the electric motor as defined in claim 1.

Such reliability is determined for example as stated in one or more of the dependent claims 2 to 7.

Still according to a possible embodiment, a detector of said reliability conditions in combination with a manual control unit of the switching unit to carry out the switching from the operating mode for determining the dose of coffee by measuring the weight of coffee in the filter-holder to the mode for determining the dose depending on the activation times of the grinders and vice versa is provided.

An embodiment, which can be possibly provided in parallel, provides that the controlling microprocessor carries out a firmware in which the switch between said two modes is carried out automatically depending on the reliability conditions of the Δ parameter.

According to still an advantageous characteristic which can be provided in combination with one or more of any characteristic offered to the user, the possibility to choose between a series of parameterized and/or parameterizable options is also allowed, at least based on:

the operating conditions of the coffee grinder, with reference to the environmental parameters in which the device is operating, such as for example the temperature, humidity, atmospheric pressure i.e. operating altitude;

the characteristics of the raw materials used such as for example the types of coffee, which is known that can vary from one producer to another and/or from batch to batch, and/or the degree of mineralization of the water used for the preparation of the infusion.

For what mentioned above an interface man-machine, preferably bidirectional, is provided, allowing the interaction between the coffee grinder and the user in the purposes better described herein below.

With reference to the aforementioned embodiments and to those objects of the following description, the controlling microprocessor can also assume the functions of switching unit, a corresponding program being provided which is executed by the processor itself and which contains the instructions for operating as a switching device.

Alternatively, all electronic operating units or at least part thereof are constituted by hardware dedicated to carrying out the corresponding functions.

BRIEF DESCRIPTION OF THE DRAWINGS

However, further characteristics and advantages of the coffee grinder according to the present invention will be better apparent by the following detailed description of a preferred embodiment of the same, provided purely by way of non-limiting example and depicted in the attached drawings, in which.

DETAILED DESCRIPTION OF THE PREFERRED EMBODIMENT

Figure 1:
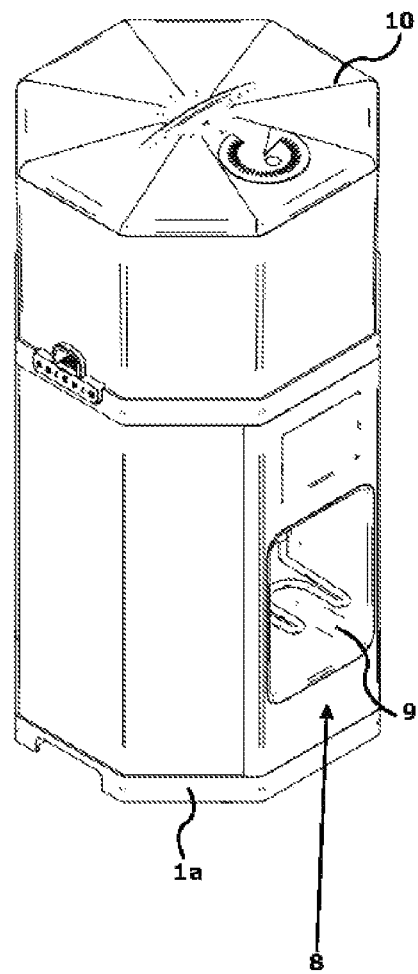
FIG. 1 is a perspective view of the coffee grinder according to the invention.
Figure 2:
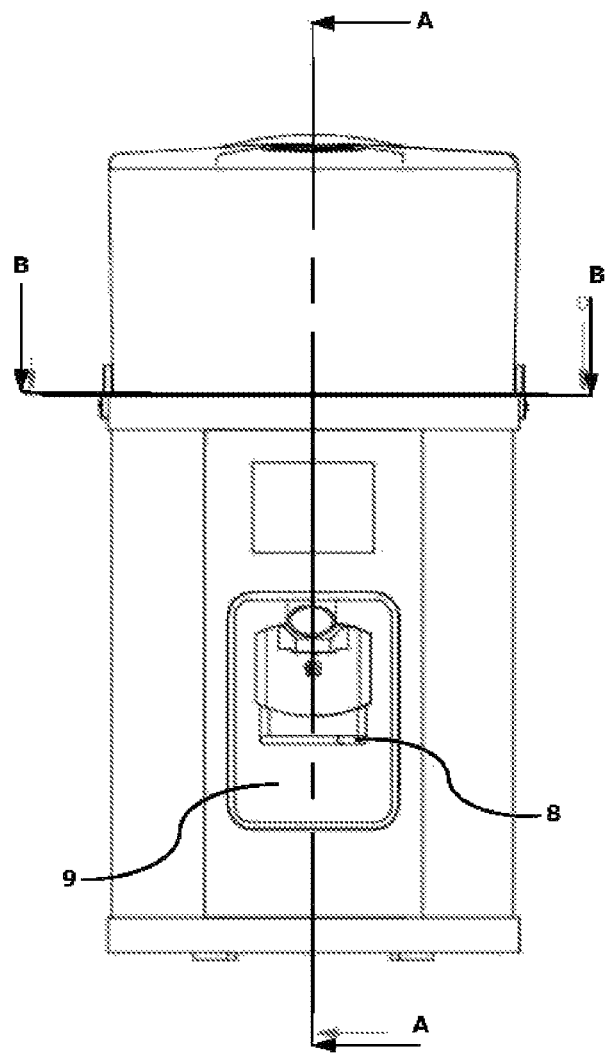
FIG. 2 is a frontal elevation view of the coffee grinder of FIG. 1.
Figure 3:
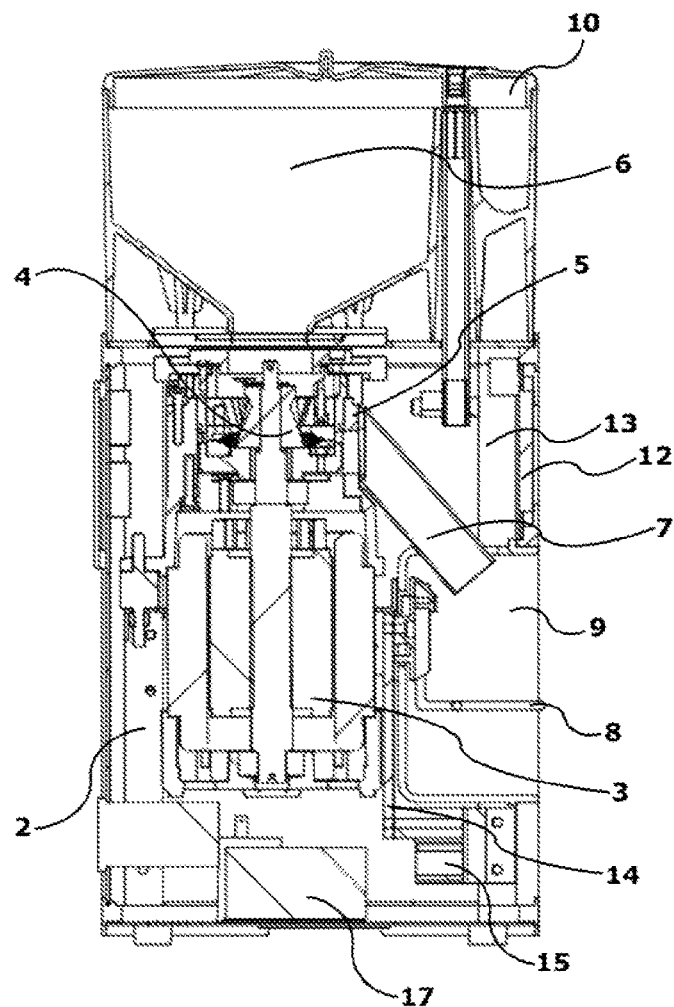
FIG. 3 is a sectional view along the plane A-A of FIG. 1.
Figure 4:
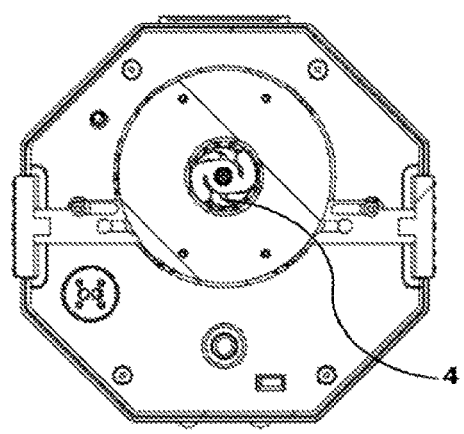
FIG. 4 is a sectional view along the plane B-B of FIG. 1.

The coffee grinder 1 of the invention, as it is well depicted in particular in FIGS. 1 to 3, has a general shape of a right prism with octagonal base 1a, which comprises a supporting frame 2, on which an electric motor 3 is installed. The shaft of the motor 3 extends towards the top part of the coffee grinder to drive a group 4 of grinders, which are housed inside a grinding chamber 5. The grinding chamber 5 has, on top, an opening which puts it in communication with a loading hopper 6 of the coffee beans. In the front position, connected to the side of the grinding chamber 5, is then provided a delivery channel 7 for delivering the ground coffee inclined in the direction of a support fork 8 of a filter-holder. The fork 8 is arranged completely inside a compartment 9 formed in the body of the coffee grinder 1 in a position adjacent to the motor 3. The hopper 6 is closed by a lid 10, also octagonal, which edge is connected, without interruptions, to the side surface of the coffee grinder 1. Above the compartment 9, on the front wall of the coffee grinder 1, a display screen 12 is arranged preferably of the touch screen type and connected to an electronic card 13 on the back embedded inside the wall of the coffee grinder 1.

Figure 5:
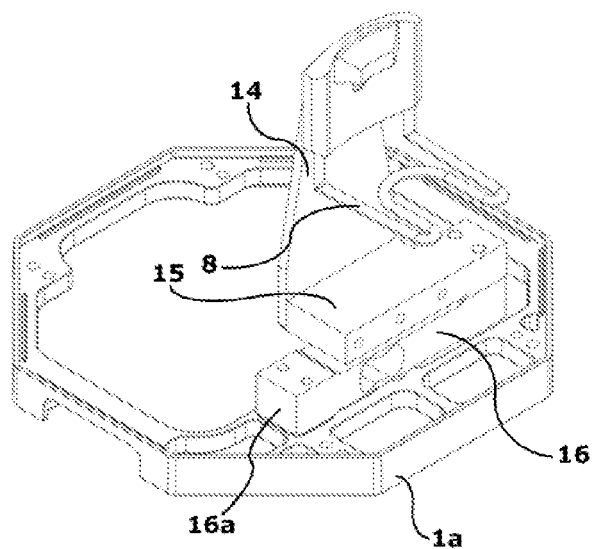
FIGS. 5 and 6 are perspective, respectively front and back, views of the weighing assembly.
Figure 6:
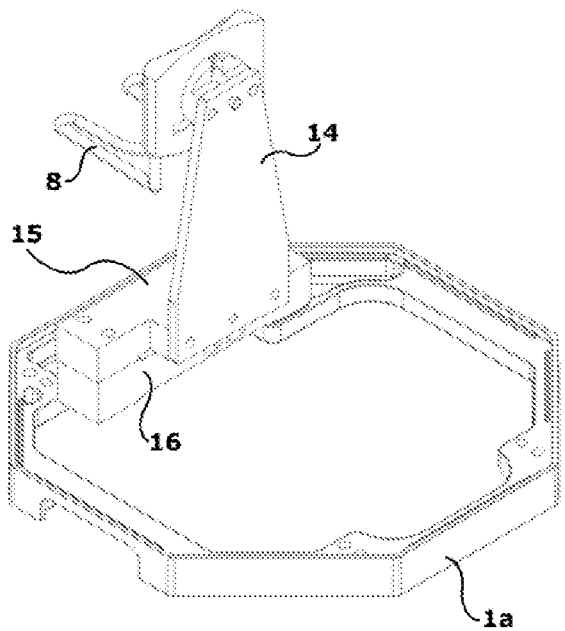

As it is clearly depicted in FIGS. 5 and 6 only depicting the weighing body housed inside the base of the coffee grinder 1, the rear end of the fork 8 is connected, via a rigid lever 14, to a pressure bar 15 integral with the free end of the load cell 16. The load cell 16 has an elongated parallelepiped shape and is constrained, at its other end 16a, to a support which is integral with the frame 2 of the coffee grinder 1. Preferably the pressure bar 15 has such a shape to lean on the whole width of the upper surface of the load cell 16, so that the load applied on the fork 8 is distributed homogeneously on the entire load cell, thus allowing to detect more accurately and precisely the weight of the dose of coffee deposited in the basket 15 of the filter-holder, without giving rise to the formation of torque on said load cell 16. The load cell 16 and the overlying pressure bar 15 are housed inside the base of the coffee grinder 1 and extend preferably below the compartment 9 and on the side of the electric motor 3. Advantageously, the fact of being housed inside a chamber instead of being exposed gives higher stability in the weight measurements to said load cell 16 and reduces the impact of the environmental conditions in which the coffee grinder is operating; in addition, said stability of the weight measurement is facilitated by the presence of at least one vibration damping system of the bodies involved in the grinding, such as for example the electric motor 3, the grinding chamber 5 and the grinder group 4.

A microcontroller 17 manages the whole operation of the coffee grinder 1 and is operatively connected to the electronic card 13 managing the touch screen 12, to the electronic card controlling the operation of the load cell 16, to the power boards managing the motor 3 and the control system of the variable position of the grinders 4 and finally to a cooling system and relative thermostat.

The fork 8 is adapted to house any type of filter-holder, in particular a single filter-holder, a double filter-holder or a filter-holder without bottom and lower spouts (also known by the term "naked"). To be noted that the particular location of the fork 8 inside the compartment 9, in addition to conferring a particularly compact design to the coffee grinder 1, also allows an important advantage to be achieved with respect to the coffee grinders of known type, which have the filter-holder fork arranged outside the body of the coffee grinder. In fact, this arrangement allows placing the load cell exactly below the fork 8 and thus having a resultant of the forces applied on the fork 8 in the center of gravity with respect to the plane of the load cell and thus free from torsional effects on the same.

The system of grinders 4 is constituted, in a known way per se, by a complex of conical and flat grinders; threaded ring nuts with autonomous control system allows the micrometric distance to be adjusted as desired between said grinders 4, to modify the granulometry profile of the ground coffee. Finally, in the proximity of the grinding chamber 5 a thermostat and a cooling system are arranged which are constituted by a motorized fan, also here in a known way per se; said cooling system is intended to prevent overheating of the grinders 4 in order to avoid the heat transfer to the coffee beans which are being ground, which could alter the organoleptic properties of coffee and possibly degrading the performance of the device possibly shortening its operating life.

In order to reduce to the greatest extent possible that residues of ground coffee stopping between the grinders 4 and the filter-holder, the grinding chamber 5 is formed so to be strictly adjacent to the outer perimeter of the grinders 4, whereas the delivery channel 7 is preferably constituted by a lapped metal material with no joints or sharp edges, in order to achieve an optimal fall of the powder of ground coffee, once this has taken the channel 7. Still for this purpose, the angle formed by the axis of the channel 7 with respect to the horizontal plane is a sufficiently big angle, preferably between 40° and 60°, for example, a 50° angle.

Advantageously, said channel 7 can comprise at least one mechanism which prevents the formation of agglomerates in the path of the coffee and/or facilitates its dissolution in the flow of air and powder which is branching in the path between the grinding chamber 5 and the outlet compartment 9. A possible embodiment of said mechanism, owned by the Applicant, comprises at least two foils suitable to be positioned to partially block the outlet mouth between the grinding chamber 5 and the delivery channel 7, and at least one outflow regulating element having a longitudinally developing conformation inside said delivery channel 7 along a path with increasing section in the direction of the end facing the outlet compartment 9.

In such embodiment, said at least two foils are shaped so as to generate a force consequent to the elasticity of the materials which, opposed to the force generated by the flow of air and powder outgoing from the grinding chamber, leads to a removal of said foils from the resting position thus increasing the dimension of the useful surface at the passage of said powders in a motion which hinders the standing of ground coffee on the edges of the orifices.

Said at least two foils are further constituted by rectangular plates made of different material, each provided with notch with three segments inclined by 90° to make a "U" shape such to define a tab inside said plate, said notch being defined in such a way as to cause the aforementioned tab to be positioned parallel to the plate, said notch being defined so as to leave said tab constrained for a linear profile to said plate 081, which linear profile constitutes an inflection line of said tab which can be further provided with a chamfer between the upper edge oriented perpendicularly to the inflection line and the edge of the tab oriented parallel to said inflection line.

In addition, said tab can be further provided with a chamfer between the bottom edge oriented perpendicularly to the inflection line and the edge of the tab oriented parallel to said inflection line.

In particular, in this embodiment the tab 0810 is made in a single piece from the plate 081 by carving and/or printing and/or punching, depending on the material used.

As mentioned, this embodiment provides at least two foils: said at least two foils have similar shapes with different sizes and are designed to be overlapped near the outlet of the grinding chamber 5 to occlude in a partial and controlled manner the flow of powders of ground coffee towards the coffee delivery channel 7.

In the path the powdered coffee follows, outgoing from the grinding chamber 5, downstream of the at least two foils described above, at least one outflow regulating element having a shape longitudinally developing inside said delivery channel 7 along a path with increasing section in the direction of the end facing the outlet compartment 9, is also provided. In this embodiment said outflow regulating element is characterized by a geometric shape similar to an elliptical sector, preferably of 180° along the major axis, resulting from the intersection of a cylinder, preferably having a circular base, with a plane whose normal is inclined by a predetermined angle with respect to the axis of symmetry of said cylinder and with a second plane whose normal lays in the area resulting from said intersection.

The action of said at least one mechanism, which as just described comprises said at least two foils and said at least one outflow regulating element, contributes significantly to achieving the purposes of the invention, in particular because, by avoiding the formation of lumps or agglomerates of coffee powder, the flow of coffee in the filter becomes more regular and thus the weight measurement detected by the load cell 16 is made more linear and predictable, with the benefit of increasing the accuracy of the desired amounts of ground coffee and of the weighing process as described herein below.

Firmware comprising a weighing program and a calibration program, by which it is possible to obtain a particularly effective control of the weight of ground coffee entering the filter-holder and of its constancy over time, is installed on the microcontroller 17. The aforementioned firmware thus, in particular, presides at continuously controlling the weighings, processing a continuous calibration of the dosage, driving the electric motor 3, operating the motorized regulation system of the grinders 4, setting the commands by the user, possibly to a wireless or wired connection for the remote control of the apparatus, controlling the temperature of the grinding chamber 5 and at the cooling system of the same. The same firmware is able to manage the operating mode by weight or time, the latter being part of the state of the art of the coffee grinders and usable when anomalies or situations are encountered which prevent from operating in direct mode, i.e. by weight as described herein below. The switching between the two modes, of which, as mentioned, the direct mode is preferable, can occur in automatic mode or else subject to manual confirmation by the operator depending on the parametrization of the device.

When the conditions for correct weight determination do not exist, for example in the event of systematic anomalies not automatically referable to a known state, the firmware is able to switch the operation to the operating mode with determination of the dose of coffee depending on the operating time of the grinders, possibly by informing and/or waiting for the confirmation by the user with whom it interacts by means of the electronic card 13 and touch screen 12.

Furthermore, the firmware of the microcontroller 17 controls the temperature of the grinding chamber 5 by the thermostat which is placed therein, by activating the fan to get cooling of the grinders 4 when necessary, in order to avoid overheating the ground coffee.

By said touch screen a wide range of information on the state of the system is also presented and different possibilities of configuring operating modes and/or updating of operating parameters of the device are also offered. For example, by said touch screen is thus possible the selection of the operating mode with direct detection of the weight which is characterizing the invention or else the choice of the operating mode with the determination of the dose of coffee depending on the operating time of the grinders.

Figure 8:
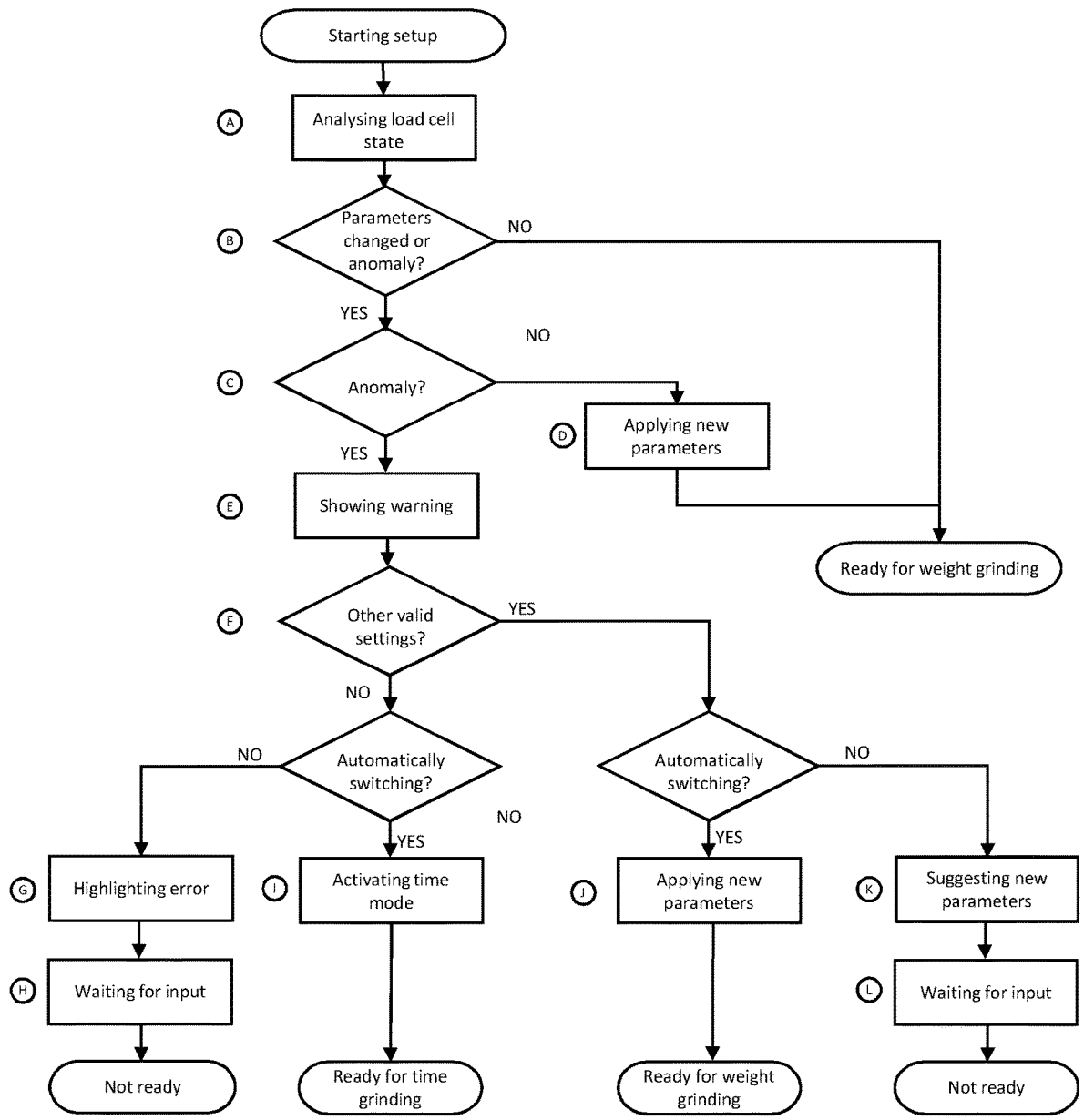
FIG. 8 is a flow diagram representing the setup operations preliminary to the grinding.

Just before a grinding operation, i.e. when the operator places the filter-holder on the fork 9 inside the compartment 9, the firmware executes a series of preliminary controls, a possible embodiment of which is shown in the flow diagram in FIG. 8. By analyzing the state of the load cell 16 (A) first of all it recognizes, based on a weight measurement carried out prior to begin the coffee grinding, which type of filter-holder is placed on the fork 8 by comparing such weight with the tares of the different types of filter-holders which can be used, stored on the microprocessor 17; it further verifies if the operator varied other operating parameters with respect to the previous grinding and if the system found anomalies (B) and, if not, the coffee grinder is made available in the mode previously used, said mode being preferentially set by weight as characterizing the invention.

If there aren't anomalies (C), thus the new parameters (D) are applied and the machine is thus ready for grinding. Said parameters, in addition to the aforementioned tares and also selected weights for the respective doses of ground coffee, for each different type of filter-holder (single, double, naked), are set by the user by means of the touch screen 12 and stored in table form, in a memory area of the microcontroller 17. Similarly, it is also possible to set up the firmware, for different possible uses or for different coffee blends, corresponding different distances between the grinders 4, for varying the granulometry of the ground coffee.

In case an anomaly (C) is found, the system highlights, also by means of audio-visual communication on the touch screen 12, a warning related to said anomaly and thus executes a further control with the purpose of finding, in the memory of the microprocessor 17, a possible usable parameter setting (F) depending on the state of the load cell 16 (A) and proceeds as follows:

If no valid settings are found and the automatic switch (I) is set, then the coffee grinder is configured to operate in time mode and consequently the dose of coffee is determined depending on the operating time of the grinding group 4;

If no valid settings are found and the automatic switching is not set, then an error is highlighted (G) possibly showing the details by means of the touch screen 12, and the system is waiting for input actions by the operator (H) and ready for grinding;

If no valid settings are found and the automatic switching is set, then the coffee grinder uses said parameter settings (J) and thus is ready to operate in direct mode;

If no valid settings are found and the automatic switching is not set, then the new configuration (K) is suggested to the operator and it is expected a confirmation from the operator himself before proceeding with the application of said parameter settings; as long as the operator has not given confirmation or acted otherwise, the coffee grinder will not be able to carry out its job.

The firmware of the microcontroller 17 then incorporates an innovative weighing program of the dose of ground coffee and a relative calibration program, to continuously adapt the parameters of the weighing program to the variable conditions in which the following weighing operations are carried out, in order to maintain the weight of the single doses constant as much as possible, preferably for example in the range of ±0.1 g about the weight value initially programmed. In order to do that, the microcontroller contains one or more memory areas, preferably non-volatile, which are used for recording the characteristic values of each weighing, said values being able to comprise, in addition to the set weight and the detected weight and consequently the deviation between said values, a series of information which can be used to reconstruct a history of operating conditions which can be used also by the operator to guide the choice of operating mode and/or the parameters best suited to reach the weight of coffee desired in the filter.

Figure 7:
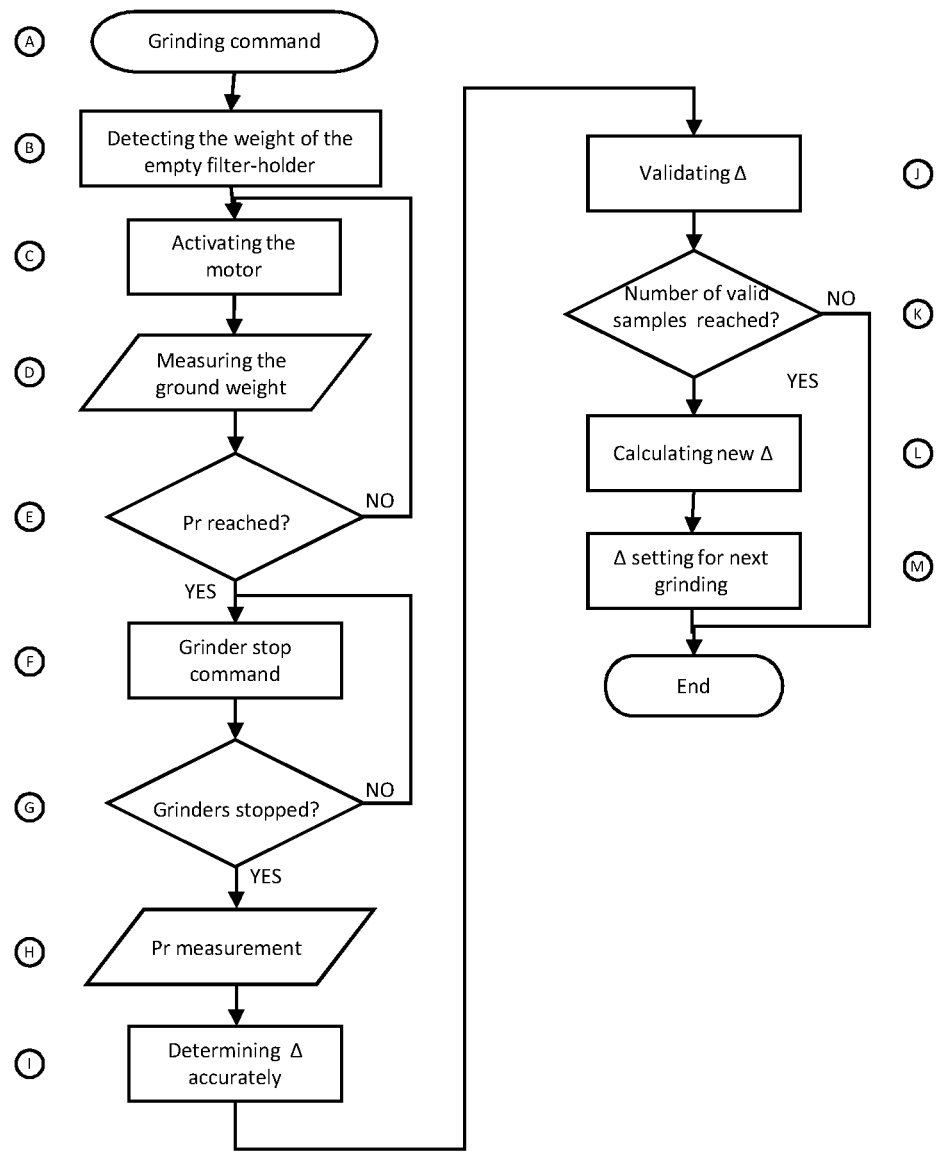
FIG. 7 is a flow diagram representing the weighing and correcting operations of the amount to be ground.

More in detail, as depicted in the flow diagram of FIG. 7, the operation in weight detection mode provides that, once the grinding command (A) is received, the weight of the filter-holder leaning on the fork 8 (B) is first detected by the load cell 16 and thus the one previously stored for said filter-holder is taken as reference for the desired final weight Pf of the dose of ground coffee. Thus, the operation of the motor 3 (C) is activated to start the grinding operation of the coffee, detecting in the meantime continuously, by the load cell 16, the progressive variation of weight of the filter-holder leaning on the fork 8 (D).

According to the fundamental characteristic of the present invention, the grinding operation is stopped (F) as soon as it is achieved a value of detected weight Pr (E) lower than the weight of the requested dose by a Δ value, corresponding to the weight of the ground coffee produced by the inertial rotation of the electric motor 3 (G) after power interruption and by that still in transit in the delivery channel 7. Thus (H):

$$Pr=Pf-\Delta$$

The amount of coffee Δ (I) resulting from the grinding after the stop command to the motor 3 and from the presence of ground coffee in transit in the channel 7 is normally constituted by some fraction of a gram. The Δ value is predetermined experimentally for each type of coffee grinder and set as standard value in manufacturing. The Δ value is thus optimized with the utmost precision, during the use of the coffee grinder, by the control logic of the calibration program of the invention, both with respect to the constant conditions typical of each individual coffee grinder (characteristics of the motor and the grinders, set granulometry and type of coffee blend used) and with respect to the variable conditions of humidity and temperature of the environment in which the coffee grinder is operating.

This weighing program was fine-tuned after the Applicant, during the studies done on the grinding operation, was able to detect that the shutdown transient of the grinding has much lower variability, in terms of weight of ground coffee, with respect to that of the warm-up transient of the grinding. Thanks to this finding the weighing program of the invention has been based on the early stop of the grinding instead of the overall grinding duration as in the coffee grinders of known type, thus achieving an extraordinarily high weight constancy of the dose of ground coffee, indeed in the order of ±0.1 g with respect to the desired dose. However, during these operations there can be situations in which the Δ value is not consistent with the expectations, for example for anomalous actions by the user or for unexpected situations arising from the grinding operation; thus the method in question provides that, for each grinding, said Δ value is validated (J) and targeted operations are carried out as a result of said validation.

The calibration program of the invention is thus addressed to determine a correct Δ value based on the series of previous weighs. The values obtained for these weighings are in fact stored and used by the firmware with the purpose of assigning a correct Δ value to each subsequent weighing, variable over time depending on the operating conditions. In case of changes in external conditions which bring the weighted doses to differ a significant value from the pre-stored weight, the firmware during the normal work of the coffee grinder thus records the weight of the doses subsequently obtained and uses it to calculate a new Δ value. This way, the firmware adopts a self-learning behavior which is executed continuously during the normal operations of the coffee grinder. As mentioned, the automatic calibration program of the invention thus excludes interruptions unwanted by the user in the work of the machine to proceed with the calibration of the desired dose. Thus, due to variations of physical dimensions, such as temperature, humidity and type of blend, the Δ value is continuously corrected by the firmware based on the weight of ground coffee which actually reaches the filter-holder leaning on the fork 8, at each individual dosage.

The algorithm on which the aforementioned calibration program is based on provides for processing weight values detected from a certain number n (K) of subsequent weighings, for example three and the value of each weighing is validated according to a specific algorithm described herein below. Thus, when three subsequent weighings are detected which differ from the desired weight in the same direction, the algorithm executes a precise processing, such as for example the mean, of such values (L) for determining the new weight value and the difference between said new weight value and the reference value is used for proportionally modifying the Δ value of coffee weight which is supplied by the coffee grinder during the shutdown transient of the motor 3. Thus, it is evident from the above that the calibration program of the present invention takes into consideration only the weight of the ground coffee and not the grinding times. The coffee grinding is in fact stopped as soon as a weight Pr=Pf−Δ is reached and the Δ value of weight is corrected depending on the actual measurements between the final weight and the programmed weight.

By way of example, let us suppose that the coffee grinder has been programmed to obtain a desired dose Pf=7 g and that experimentally a Δ value=0.8 g has been determined. In this case the firmware of the microcontroller 17 sends a stop command to the motor 3 as soon as a weight of 6.2 g is detected on the fork 8 by the load cell 16. Then in these conditions, let us suppose that the mean of the three subsequent weighings is actually 7.3 grams i.e. exceeding by 0.3 g the desired value, the Δ value is directly proportionally increased, i.e. bringing it in this case to Δ=0.8 g+0.3 g=1.1 g. Based on this new Δ value the following weighings are carried out and the process continues in an iterative way until it stabilizes about a desired value Pf with maximum tolerance, for example of ±0.1 g with respect to the reference value set, until the external working conditions have some variation determining a new modification of the Δ value. In case a so-calculated Δ value differs from that immediately preceding by more than 1 g, thus showing that there has been a significant variation in the working conditions, the firmware is programmed so to reset the storage of the previous weighs and restart with a new series of weighings for the determination of the Δ value.

Figure 9:
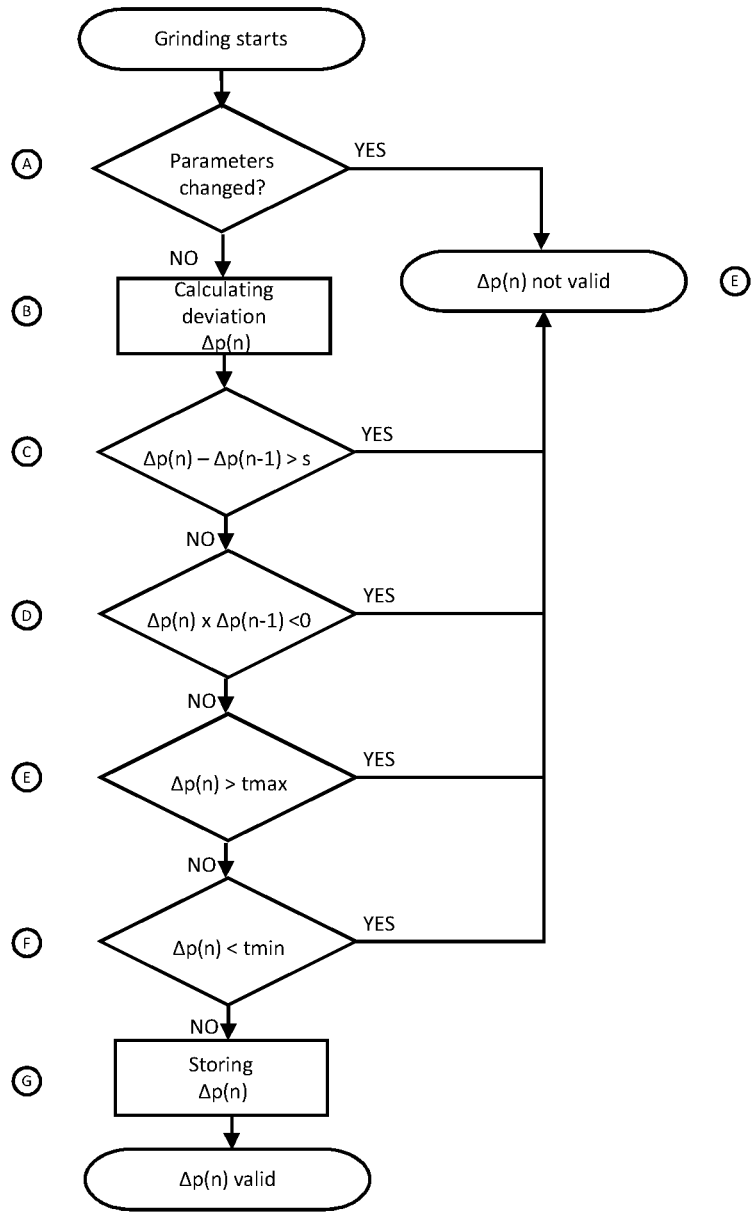
FIG. 9 is a flow diagram representing the validation operations of the weighing values downstream of the grinding.

As exemplified in the flow diagram in FIG. 9, the detection of the weighings, used for the calibration program described above, is automatically interrupted each time a variation of the working parameters is carried out, for example when the distance of the grinders 4 is modified, or else when the coffee blend (A) is changed. It is considered preferable that the weight figure of the dose of ground coffee following immediately such variation is not detected by the self-learning system, as this figure is affected unpredictably by the aforementioned variation. A possible modification of the Δ value is thus calculated based on a new complete cycle of weighings which are carried out after the first grinding following the aforementioned variation. If the operating parameters have not been altered, thus the deviation (B) between the target weight Pr and the final weight Pf measured by the load cell 16 at the end of the grinding operation here defined as Δp(n) is processed, to indicate the accurate weighing difference for the n-th weighing.

For being considered valid, said Δp(n) value is precisely analyzed by the firmware according to a series of controls which in this embodiment comprise at least:

a comparison with the value detected at the end of the previous grinding and herein below denoted as Δp(n−1): if the difference between the two values, Δp(n) and Δp(n−1), is higher than a pre-set threshold value s, the sample is considered not valid (C);

a comparison with the detected value at the end of the previous grinding and herein below depicted as Δp(n−1): if the sign of the two values has varied, i.e. if Δp(n)>0 and Δp(n−1)<0 or vice versa, the sample is considered not valid; in another way, this is expressed with the algebraic product between Δp(n) and Δp(n−1) and the condition of invalidity is when Δp(n)×Δp(n−1)<0 (D);

an analysis of the Δp(n) absolute value which to be considered valid must be included between two threshold parameters, themselves also pre-set and settable, in the flow diagram depicted with as $t_{min}$ (F) and $t_{max}$ (E).

Other checks in addition to what is shown by way of example can however be implemented by a technician in the art without precluding the concept of the invention.

In the event that the checks are successful, the Δp(n) value is considered valid and stored in the memory of the microprocessor 17 (G) for being subsequently processed in order to determine the new Δ value of the system according to what already described in FIG. 7.

By the previous description is clear how the coffee grinder according to the present invention has fully achieved the desired purposed. The weighing program used by the coffee grinder in fact provides for detecting only the weight of the ground coffee which has actually reached the filter-holder, thus avoiding all the drawbacks linked to the previous measurement types based on the operating time of the grinders. The grinding is stopped when the weight thus detected differs by the desired final value by a value corresponding to the weight of the coffee ground during the shutdown transient of the grinders. The Δ weight value has the characteristic of being substantially constant, with equal working conditions, and thus can be easily determined experimentally and constantly optimized when varying the working conditions by the calibration program of the invention. Such calibration program uses, as seen above, a particularly simple algorithm, which can thus be effectively managed by low-cost electronics.

The coffee grinder of the present invention thus offers outstanding advantages with respect to the coffee grinders of known type, both in terms of the high weight constancy of dosage of ground coffee, and in terms of the lower manufacturing cost, and finally in terms of the great ease and comfort of use. The constant calibration program used in the coffee grinder of the invention does not require any operator intervention who must only be limited to setting, only once, the weight value of the desired doses of ground coffee, for each individual type of filter-holder used.

It is understood that the invention should not be considered limited to the particular arrangements illustrated above, constituting only exemplary embodiments thereof, but that different variants are possible, all within the reach of a technician of the art, without for this reason departing from the scope of protection of the invention itself, which is only defined by the claims below.

The invention claimed is:

1. A coffee grinder with a weight control device of a dose of ground coffee, comprising:

an electric motor (3);

a grinder group (4) driven by said electric motor (3) and housed inside a grinding chamber (5);

a feed hopper (6) for feeding coffee beans to be ground to said grinding chamber (5);

a delivery channel (7) for delivering the ground coffee to a support fork (8) of a filter-holder to be loaded with the ground coffee; and a load cell (16) mechanically connected to said support fork (8) and a microprocessor (17), which controls an operation of the electric motor (3) to determine a desired final dose having a final value (Pf) of the ground coffee inside said filter-holder, wherein said microprocessor (17) contains control firmware which, when weighing a new dose of coffee as required by a user, activates a weighing program which provides the following operational steps in succession:

a) activating the electric motor (3) to cause the grinder group to grind the coffee beans;

b) continuously controlling, with said load cell (16), a detected weight (Pr) of the ground coffee which, through said delivery channel (7), reaches the filter-holder leaning on said support fork (8); and c) determining a shutdown of the electric motor (3) when said detected weight (Pr) reaches a value Pr=Pf−Δ where Δ is a predetermined value corresponding to a weight of the ground coffee reaching the filter-holder during a shutdown transient of the electric motor (3), wherein said Δ value is initially predetermined experimentally, depending on constant characteristics of each individual type of coffee grinder, and is continuously calibrated during operation of the coffee grinder, depending on variable conditions in which said coffee grinder is operating, and wherein the control firmware of said microprocessor (17) further provides a continuous calibration program of said Δ value which comprises:

d) storing a predetermined number (n) of subsequent weighings;

e) calculating a mean weigh value on said predetermined number (n) of subsequent weighings;

f) determining a mean deviation between said mean weigh value and the final value (Pf) of desired weighing; and g) modifying the Δ value directly proportional to said mean deviation.

2. The coffee grinder according to claim 1, wherein, in said step d), weigh values are acquired, passing to step e) only when all weighings have a same variation sign with respect to the final value (Pf).

3. The coffee grinder according to claim 1, wherein, in step d), weighings having an excess value with respect to a predetermined reference value are discarded.

4. The coffee grinder according to claim 1, wherein, in step d), one or more weighings following immediately a discontinuous variation of characteristics of the coffee grinder or blend of the ground coffee are discarded.

5. The coffee grinder according to claim 1, wherein when the Δ value calculated in step g) differs from the Δ value previously calculated by more than a predefined limit value, storage of previous weighs is reset and the calibration program is restarted starting from a new calculated Δ value.

6. The coffee grinder according to claim 1, wherein, before step a), said weighing program provides a preliminary step, in which a weight of the filter-holder leaning on the support fork (8) is detected and the corresponding desired final dose having the final value (Pf) of the ground coffee is selected from a table stored on said microprocessor (17) of tares of different filter-holders in use on the coffee grinder and of the final value (Pf) of related doses of the ground coffee.

7. The coffee grinder according to claim 1, wherein a rear end of said support fork (8) is connected, with a rigid lever (14), to a pressure bar (15) integral with a free end of said load cell (16).

8. The coffee grinder according to claim 7, wherein a shape of said pressure bar (15) is such to lean on an entire width of an upper surface of the load cell (16), so that a load applied on the support fork (8) is homogeneously distributed on an entirety of the load cell (16).

9. The coffee grinder according to claim 8, wherein said support fork (8) is arranged inside a compartment (9) formed inside a body of the coffee grinder (1), so as to be arranged above said load cell (16).

10. The coffee grinder according to claim 1, wherein said delivery channel (7) is made from a lapped metal material with no joints and sharp edges.

11. The coffee grinder according to claim 10, wherein an angle formed by an axis of said delivery channel (7) with respect to a horizontal plane is an angle between 40° and 60°.

\* \* \* \* \*